US012640662B1

(12) United States Patent
D'Amico et al.

(10) Patent No.: US 12,640,662 B1
(45) Date of Patent: May 26, 2026

(54) MODULAR POWER MANAGER FOR CONNECTING A POWER GRID TO AN APPLIANCE WITH A BATTERY

(71) Applicant: Impulse Labs, Inc., San Francisco, CA (US)

(72) Inventors: Samuel Redmond D'Amico, San Francisco, CA (US); Bradley James Tallon, Arcadia, CA (US); Samuel William Lenius, Palo Alto, CA (US); Jacob Russell Davis, Albany, CA (US)

(73) Assignee: Impulse Labs, Inc., San Francisco, CA (US)

( * ) Notice: Subject to any disclaimer, the term of this patent is extended or adjusted under 35 U.S.C. 154(b) by 0 days.

(21) Appl. No.: 19/292,678

(22) Filed: Aug. 6, 2025

(51) Int. Cl.
H02M 7/00 (2006.01)
H02M 7/537 (2006.01)

(52) U.S. Cl.
CPC ........... H02M 7/003 (2013.01); H02M 7/537 (2013.01)

(58) Field of Classification Search
CPC ................................. H02M 7/003; H02J 3/32
See application file for complete search history.

(56) References Cited

U.S. PATENT DOCUMENTS

| | | | |
|---|---|---|---|
| 10,090,777 B2 | 10/2018 | Dent | |
| 10,965,124 B2 * | 3/2021 | Laval | H02J 13/00004 |
| 11,621,667 B2 | 4/2023 | Allen | |
| 2014/0049886 A1 | 2/2014 | Lee et al. | |
| 2022/0045511 A1 * | 2/2022 | Clifton | H02J 7/0068 |
| 2022/0216728 A1 * | 7/2022 | Ashman | H02J 13/00002 |
| 2024/0235202 A1 * | 7/2024 | Griffith | H02J 7/0063 |
| 2025/0071864 A1 | 2/2025 | Faraji-Tajrishi et al. | |

* cited by examiner

*Primary Examiner* — Gary A Nash
(74) *Attorney, Agent, or Firm* — COOLEY LLP

(57) ABSTRACT

An apparatus includes a housing. The housing has an interface portion configured to complementarily fit with an interface portion of an appliance. The apparatus includes a communication interface configured to be removably coupled with the appliance. The apparatus includes a power interface configured to be removably coupled with the appliance. The apparatus includes a processor configured to identify an appliance type of the appliance based on appliance communications and generate a signal based on the appliance type. The apparatus includes an AC interface configured to be coupled with an AC grid. The apparatus includes a battery. The apparatus includes a multi-mode inverter configured to receive power from the AC grid and/or the battery and send power to the appliance, based on the signal. The communication interface, the power interface, the processor, the AC interface, the battery, and the multi-mode inverter are each at least partially disposed in the housing.

20 Claims, 6 Drawing Sheets

200

100

200

APPLIANCE 320

INTERFACE PORTION 321

INTERFACE PORTION 311

HOUSING 310

APPLIANCE 340

INTERFACE PORTION 341

APERTURE 332

INTERFACE PORTION 331

APERTURE 334

HOUSING 330

MODULAR POWER MANAGER FOR CONNECTING A POWER GRID TO AN APPLIANCE WITH A BATTERY

TECHNICAL FIELD

The present application relates to power electronics and energy systems, and more particularly to a modular power management system configured to be removably coupled with appliances.

BACKGROUND

As household appliances evolve to incorporate advanced energy features, including batteries, solar compatibility, and smart-grid readiness, there is a growing demand for embedded inverter systems that are not only power-efficient but also versatile, compact, and standards-compliant. Known inverter solutions, however, suffer from several shortcomings.

Many known inverter systems currently available on the market are not designed with appliance-level integration in mind. Many are built as standalone units meant for installation in dedicated energy management areas, such as garages or utility closets, and are not suitable for the compact, heat-sensitive environments typical of household appliances like cooktops or ovens. This mismatch in design context creates substantial challenges when trying to embed such inverters directly into appliances, often resulting in thermal inefficiencies, spatial constraints, and costly product redesigns.

Another limitation in known inverter systems lies in its narrow voltage and frequency compatibility. In a global appliance market, it is desirable for devices to function across various regional power standards, for instance, 120 volts root mean square (RMS) at 60 Hz in North America, and 230 volts RMS at 50 Hz in many other parts of the world. Known inverter systems typically have region-specific hardware configurations, leading manufacturers to produce and support multiple product variants. This complexity drives up manufacturing costs, complicates supply chains, and introduces additional hurdles in certification and maintenance.

Bidirectional power capability, where devices can both consume and supply power to the grid, is increasingly desirable, particularly in the context of smart homes and distributed energy systems. However, known inverter solutions that do support bidirectionality are usually built for larger-scale, whole-home systems, and are rarely suitable for integration into individual appliances. Furthermore, many known inverters are designed for 208 V or 240 V applications, and very few, if any, support 120 V AC backfeeding. This is especially problematic in the U.S., where emerging interest in 120 V backfeed scenarios remains underserved due to technical and regulatory inertia.

The physical design of many known inverters further complicates their application in appliance integration. These units tend to be large, heavy, and tailored for wall- or rack-mount installations, making them ill-suited for compact appliances with strict dimensional constraints. Often, known inverters include unnecessary features and excess capacity that add cost and size without contributing to appliance functionality, resulting in inefficient use of space and materials.

Further, known inverter solutions generally lack a holistic, system-level design approach that would allow for modular reuse across multiple appliances. Manufacturers often engineer separate inverter systems for each appliance model or size, which hinders scalability and limits opportunities to streamline production and certification efforts. This lack of a unified design platform can prevent companies from achieving economies of scale and adds engineering overhead at every stage of the product development lifecycle.

SUMMARY

In some embodiments, an apparatus includes a housing. The housing has an interface portion configured to complementarily fit with an interface portion of an appliance. The appliance is of an appliance type. The apparatus also includes a communication interface. The communication interface is at least partially disposed in the housing and is configured to be communicatively, removably coupled with the appliance. The apparatus also includes a power interface. The power interface is at least partially disposed in the housing and is configured to be electrically, removably coupled with the appliance. The apparatus also includes a processor. The processor is at least partially disposed in the housing and is configured to identify the appliance type from a plurality of appliance types in response to a communicative coupling between the communication interface and the appliance. The processor is also configured to generate a control signal based on the appliance type. The apparatus also includes an alternating-current (AC) interface. The AC interface is at least partially disposed in the housing and is configured to be electrically coupled with an AC grid. The apparatus also includes a battery. The battery is at least partially disposed in the housing. The apparatus also includes a multi-mode inverter. The multi-mode inverter is at least partially disposed in the housing. The multi-mode inverter is configured to receive at least one of first power output from the AC grid or second power output from the battery. The multi-mode inverter is also configured to send third power output to the appliance during operation of the appliance, via the power interface and based on the control signal.

In some embodiments, a method includes measuring, using a sensing circuit of a multi-mode inverter, a voltage of an appliance. The appliance is from a plurality of appliances. The multi-mode inverter is at least partially disposed in a housing. The housing has an interface portion configured to complementarily fit with an interface portion of the appliance from the plurality of appliances. The method also includes rectifying, using the multi-mode inverter and in response to the voltage being a direct-current (DC) voltage, an alternating-current (AC) input to produce a DC output. The method also includes sending, from the multi-mode inverter, the DC output to the appliance during operation of the appliance from the plurality of appliances. The method also includes sending, from the multi-mode inverter and in response to the voltage being an AC voltage, an AC output to the appliance during operation of the appliance.

In some embodiments, an apparatus includes a housing. The housing has an interface portion configured to complementarily fit with an interface portion of an appliance. The appliance is from a plurality of appliances. Each appliance from the plurality of appliances is of an appliance type from a plurality of appliance types. The apparatus also includes a power interface. The power interface is at least partially disposed in the housing. The power interface is configured to be electrically, removably coupled with the appliance from the plurality of appliances. The apparatus also includes an alternating-current (AC) interface. The AC interface is at least partially disposed in the housing. The AC interface is configured to be electrically coupled with an AC grid. The apparatus also includes a battery. The battery is at least partially disposed in the housing. The apparatus also includes a multi-mode inverter. The multi-mode inverter is at least partially disposed in the housing. The multi-mode inverter has at least a first mode, a second mode, and a third mode each defined at least in part by the appliance type. The multi-mode inverter in the first mode is configured to receive a first AC output from the AC grid, rectify the first AC output to produce a first DC output, and send the first DC output to the battery. The multi-mode inverter in the second mode is configured to receive a second DC output from the battery, invert the second DC output to produce a second AC output, and send the second AC output to the AC grid. The multi-mode inverter in the third mode is configured to send power output to the appliance from the plurality of appliances during operation of the appliance from the plurality of appliances, via the power interface.

DETAILED DESCRIPTION

As described earlier, modern appliances increasingly incorporate energy storage and renewable integration capabilities. Known inverter solutions, however, are generally not optimized for appliance-level integration, nor do they support wide voltage operation or bidirectional energy flow in compact formats. Known inverter solutions are either too bulky, too limited in voltage/frequency compatibility, or not compliant with emerging backfeeding applications (e.g., 120V AC backfeed in the United States).

To address these problems, the present disclosure provides one or more embodiments of a modular power management "core" (also referred to herein as a "modular core") that can be removably coupled with household appliances to provide seamless energy management, energy storage integration, and bidirectional power flow. The one or more embodiments of the modular power management core can support single-SKU global deployment. Known inverter designs are often region-specific, having different versions to meet the varying voltage and frequency standards found across global markets. In contrast, the modular power management core disclosed herein can operate across a wide input voltage range, from approximately 100 to 240 volts, and to support both 50 Hz and 60 Hz grid frequencies. This universal compatibility can allow manufacturers to produce a single SKU that can be deployed virtually anywhere in the world without modification. As a result, logistics and inventory management are greatly simplified, while production and certification efforts are streamlined, leading to reduced operational costs and improved time to market.

In addition to its universal input support, the one or more embodiments of the modular core can also be configured to be bidirectionally capable at 240 V and forward compatible with emerging 120 V backfeeding applications. Grid-interactive appliances that can return power to the home or grid are a growing segment of the residential energy landscape. While 240 V backfeed functionality is supported by some known systems, 120 V bidirectional capability, especially in compact, appliance-grade formats, remains largely unsupported. The one or more embodiments of the multi-mode inverter anticipate and address that need, offering near-term interoperability with existing 240 V infrastructure while remaining adaptable to future regulatory frameworks that can authorize or encourage 120 V backfeeding in North America and other markets.

Figure 1:
FIG. 1 is a block diagram of a power management system with a communicative coupling to an appliance, according to an embodiment.
Figure 1:
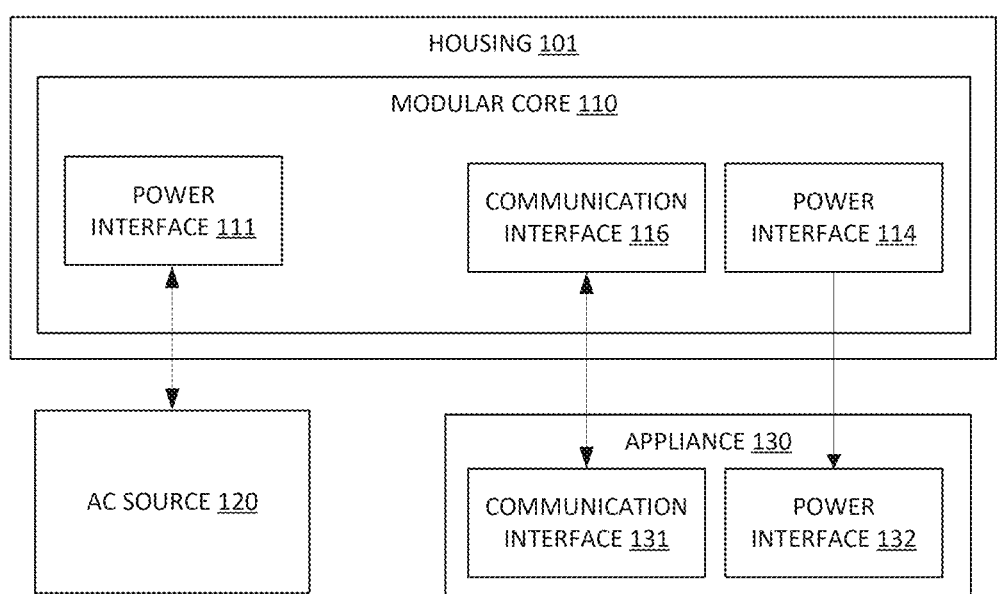

FIG. 1 is a block diagram of a power management system with a communicative coupling to an appliance, according to an embodiment. The power management system 100 includes a housing 101, a modular core 110, an AC source 120, and an appliance 130. The modular core 110 can manage bidirectional energy flow, meaning it can both consume and deliver energy depending on conditions of the power management system 100.

The AC source 120 can be, for example, an AC grid, a generator, and/or the like that, when coupled to the modular core 110, can send AC energy to the modular core 110. The modular core 110 can convert the AC energy to DC energy to charge a battery (not shown in FIG. 1) and/or power the appliance 130. Instead, or in addition, the modular core 110 can send the AC energy to the appliance 130. The modular core 110 can be configured to handle wide AC voltage ranges (e.g., 100-240 V) and dual frequencies (50 Hz or 60 Hz).

The appliance 130 can be any device designed for a specific function within a domestic, commercial, or industrial environment. The appliance 130 can be of an appliance type. The appliance type can be defined by shared characteristics among multiple appliances such as the function of the appliance 130, an amount of power consumed by the appliance 130, the environment in which the appliance 130 is deployed, the ability (e.g., communicative ability, etc.) of the appliance 130 to interface with other devices, and/or other suitable shared characteristics. The appliance 130 can be and/or include, for example, DC devices such as internal electronics, DC appliances, battery-powered devices, DC fast chargers, and/or AC appliances such as stoves, ovens, refrigerators, dishwashers, air conditioners, laundry machines, microwaves, etc. The appliance 130 can include ice makers, kegerators, wine coolers, beverage coolers, outdoor kitchens, outdoor pizza ovens, and/or the like. In implementations where the appliance 130 is a stove, for example, the appliance type can be described as a stove, a heating device, a kitchen appliance, and/or the like. The appliance 130 includes a power interface 132 and a communication interface 131.

The power interface 132 of appliance 130 can be coupled to the power interface 114, which can receive power to operate the appliance 130. For example, the power interface 132 of the appliance 130 can include receptacles configured to receive an electrical plug that is connected to the power interface 114. The communication interface 131 of the appliance 130 can facilitate communications with other devices, such as the modular core 110 or other devices (not shown). In some implementations, the appliance 130 can be manufactured specifically to operate with the modular core 110, or another modular core with the same form factor and compatible electronics (not shown).

The housing 101 can enclose the components of the modular core 110, including the power interface 111, the power interface 114, the communication interface 116, and other components (not shown in FIG. 1). In some instances, the housing 101 can include one or more layers, which can serve various functions. For example, the housing 101 can include a conductive layer (or portion), such as a metal chassis, which can provide structural integrity to the modular core 110 and absorb and/or reflect electromagnetic interference. Instead, or in addition, the housing 101 can include a transparent layer (or portion), such as glass, through which the components of the modular core 110 can be made visible to a user without having to modify the housing 101. In some instances, the housing 101 can include one or more apertures or recesses (not shown in FIG. 1), which can provide access to connection points such as the power interface 111, the power interface 114, or another interface (not shown in FIG. 1). In some instances, the housing 101 can be configured to be removably coupled to the appliance 130. For example, the housing 101 can have an interface portion configured to complementarily fit with an interface portion of the appliance 130, as illustrated with respect to FIGS. 3A-3B.

The modular core 110 can be and/or include power electronics (not shown in FIG. 1) to manage and distribute power between the AC source 120 and the appliance 130. The modular core 110 can be configured to be coupled to the appliance 130 and not another appliance at the same time. Therefore, the modular core 110 can be configured to provide power to the appliance 130, and not to another appliance at the same time. As used herein, modular is understood to mean a device that can be coupled to and operate with an appliance from multiple possible appliances that are of different appliance types (e.g., a stove and a refrigerator), of the same appliance type (e.g., two stoves), and/or that consume different types of energy (e.g., DC or AC energy). The modular core 110 can be removably coupled to the appliance 130 at a first time, and, in some implementations, removably coupled to another appliance (not shown) at a second time after being removed from the appliance 130. Instead, or in addition, for a given time period, the modular core 110 can be removably coupled to the appliance 130, and another modular core (not shown) can be coupled to another appliance (not shown). As shown, the modular core 110 can be included within the housing 101. The modular core 110 includes a power interface 111, a power interface 114, and a communication interface 116.

The power interface 111 can be any suitable terminal for sending and/or receiving AC output to and/or from the AC source 120. For example, the power interface 111 can include high-voltage alternating current (HVAC) screw terminals, which can use, for example, screw-based mechanical fasteners to securely attach AC power lines to the modular core 110. Instead, or in addition, the power interface 111 can include, for example, an AC receptacle for receiving an electrical plug configured to send and/or receive AC output. The power interface 111 can be coupled to an AC bus within the modular core 110. The power interface 111 can handle, for example, 120 V or 240 V single-phase AC and optionally split-phase (L1/L2/N) inputs, depending on the configuration. Accordingly, the power interface 111 can be electrical connection interface(s) for high-voltage AC lines, used for bringing power into the modular core 110 (e.g., from the AC source 120) and/or sending it out (e.g., to the appliance 130 or back to the AC source 120).

The power interface 114 can include any suitable terminal(s) for sending AC output and/or DC output to the appliance 130. Similar to the power interface 111, the power interface 114 can include, for example, high-voltage alternating current (HVAC) screw terminals, and/or high-voltage direct-current (HVDC) screw terminals. Instead, or in addition, the power interface 114 can include, for example, an AC receptacle for receiving an electrical plug configured to send and/or receive AC output, and/or a DC receptacle for receiving an electrical plug configured to send and/or receive DC output. Similar to the power interface 111, the power interface 114 can handle 120 V or 240 V single-phase AC and optionally dual-phase (L1/L2/N) inputs, depending on the configuration. The power interface 114 can be configured to handle the DC power transmission through a DC bus.

The communication interface 116 can include any suitable terminal(s) for sending signals to and/or receiving signals from the communication interface 131 of the appliance 130. The communication interface 116 can be configured to be coupled to a communication bus in the modular core 110 (not shown in FIG. 1). For example, the communication interface 116 can be a control area network (CAN) connector that provides communicative access to a CAN bus within the modular core 110. The communication interface 116 can enable the modular core 110 to communicatively couple with communicatively compatible appliances.

Figure 2:
FIG. 2 is a block diagram of a power management system with a communicative coupling to an appliance, according to an embodiment.
Figure 2:
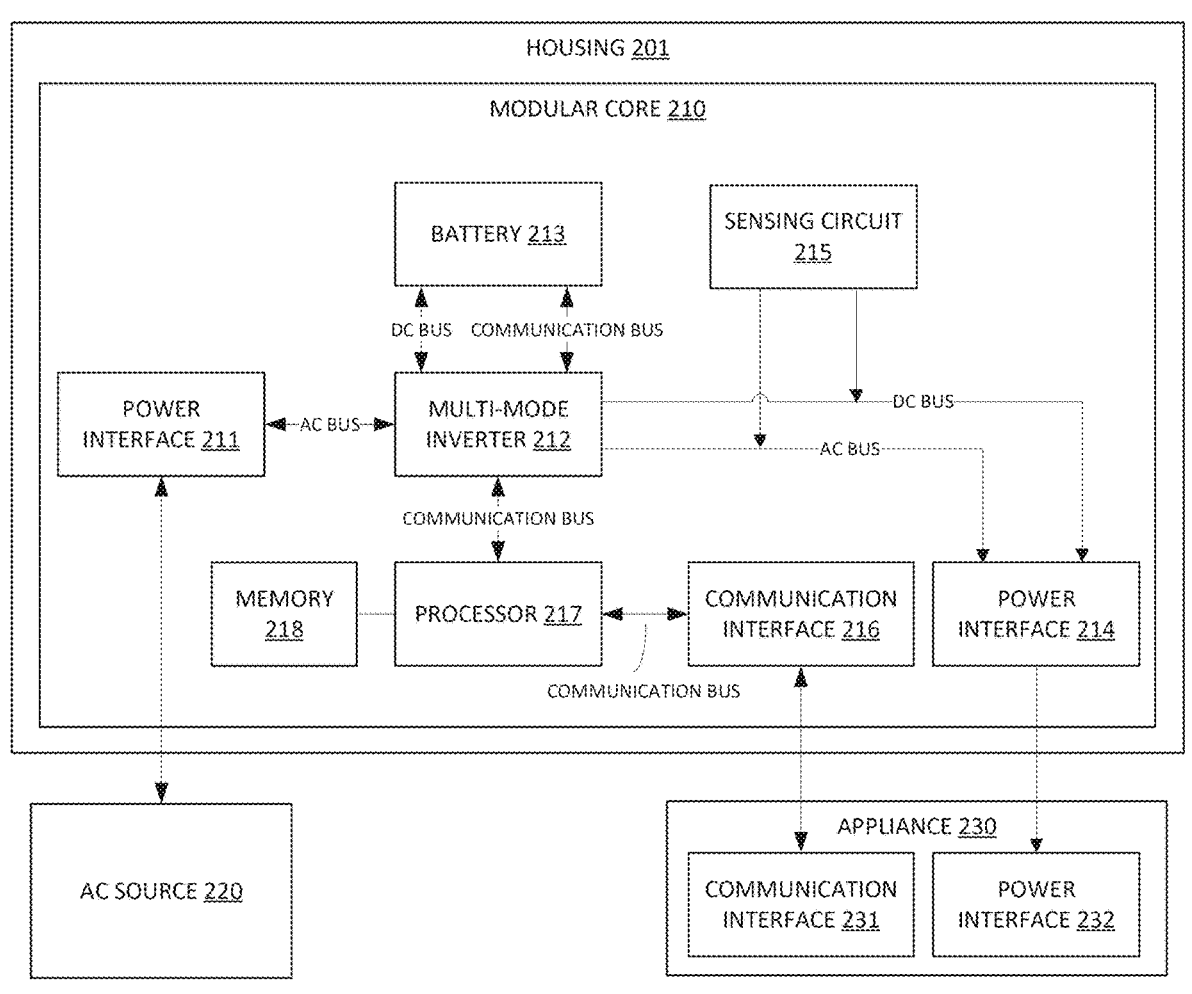

FIG. 2 is a block diagram of a power management system 200 with a communicative coupling to an appliance, according to an embodiment. The power management system 200 can be structurally and/or functionally similar to the power management system 100 of FIG. 1. The power management system 200 includes a housing 201 (e.g., structurally and/or functionally similar to the housing 101 of FIG. 1), a modular core 210 (e.g., structurally and/or functionally similar to the modular core 110 of FIG. 1), an AC source 220 (e.g., structurally and/or functionally similar to the AC source 120 of FIG. 1), and an appliance 230 (e.g., structurally and/or functionally similar to the appliance 130 of FIG. 1). Similarly to the modular core 110 of FIG. 1, the modular core 210 can manage bidirectional energy flow depending on conditions of the power management system 200. The modular core 210 can include an internal communication bus that can facilitate communications between the modular core 210 and the (communicative) appliance 230. For example, the appliance 230 can communicate with the modular core 210 to cause a processor 217 of the modular core 210 to take steps to ensure that the output current of the multi-mode inverter 212 is substantially equal to the input current of the appliance 230.

The modular core 210 can be and/or include components configured to manage and distribute power between the AC source 220, the battery 213, and the appliance 230. The modular core 210 can be configured to be coupled to the appliance 230 and not another appliance at the same time. Therefore, the modular core 210 can be configured to provide power to the appliance 230, and not to another appliance at the same time. As used herein, modular is understood to mean a device that can be coupled to and operate with an appliance from multiple possible appliances that are of different appliance types (e.g., a stove and a refrigerator), of the same appliance type (e.g., two stoves), and/or that consume different types of energy (e.g., DC or AC energy). In this way, the modular core 210 can be removably coupled to the appliance 230 at a first time, and, in some implementations, removably coupled to another appliance (not shown) at a second time after being removed from the appliance 230. Instead, or in addition, for a given time period, the modular core 210 can be removably coupled to the appliance 230, and another modular core (not shown) can be coupled to another appliance (not shown). As shown, the modular core 210 can be included within the housing 201. The modular core 210 includes a power interface 211 (e.g., structurally and/or functionally similar to the power interface 111 of FIG. 1), a multi-mode inverter 212, a battery 213, a power interface 214 (e.g., structurally and/or functionally similar to the power interface 114 of FIG. 1), a sensing circuit 215, a communication interface 216 (e.g., structurally and/or functionally similar to the communication interface 116 of FIG. 1), a processor 217, and a memory 218, which can be coupled together by a communication bus, DC buses and/or AC buses.

The sensing circuit 215 can be and/or include a voltage sensor (e.g., a voltage divider, etc.) configured to measure a voltage potential associated with the appliance 230, and/or a current sensor (e.g., a shunt resistor, etc.) configured to measure a current draw associated with the appliance 230. In some instances, the sensing circuit 215 can be configured to measure electrical characteristics of the DC bus, for example, when the appliance 230 is coupled to a DC bus via a connection to the power interface 214. In some instances, the sensing circuit 215 can be configured to measure electrical characteristics of an AC bus, for example, when the appliance 230 is coupled to an AC bus via a connection to the power interface 214. In some instances, the sensing circuit 215 can be configured to measure electrical characteristics of a DC bus and an AC bus, for example, when the appliance 230 is coupled to a DC bus and an AC bus via respective electrical connections at the power interface 214. The sensing circuit 215 can produce measurement values that can be sent, via the communication bus, to the processor 217. The processor 217 can be caused to determine the type of voltage and/or type of current of the appliance 230 (e.g., AC voltage or DC voltage).

In some implementations, the sensing circuit 215 can include analog circuits such as operational amplifiers (e.g., a comparator circuit), transistors, relays, and other suitable circuitry that can couple to the multi-mode inverter 212 to, for example, cause the multi-mode inverter 212 to switch modes. For example, the voltage sensor can be configured to reduce ("step down") the voltage of the DC bus and/or of the AC bus, to produce a measurement value that can be input to other components of the sensing circuit 215. The comparator can have a have an input ("reference") voltage (e.g., a 3.3V line, a 5V line, a 12V line, etc.), which can be provided by, for example, the multi-mode inverter 212. The comparator can compare the measurement value to the reference voltage. When the measurement value is greater than or equal to the reference voltage, the comparator can output a signal that represents a logic level high (e.g., a signal with a voltage potential that is substantially equal to a voltage line that powers the comparator). When the measurement value is less than the reference voltage, the comparator can output a signal that represents a logic level low (e.g., a signal with a voltage potential that is substantially equal to a ground of the comparator). The output of the comparator, when high, can drive a current across a transistor, to cause the multi-mode inverter 212 to switch into one of, for example, DC supply mode. Conversely, the output of the comparator, when low, cause the multi-mode inverter 212 to switch into, for example, AC supply mode.

The battery 213 can be an energy storage device. The battery 213 can be charged when excess AC power or DC power is available, or can be discharged to supply energy to power the appliance when the AC source 220 is unavailable (e.g., during a power outage) or insufficient (e.g., during a time of peak withdrawal from a grid). The battery 213 can include a power interface (not shown) that can connect (e.g., via the DC bus) to the multi-mode inverter 212 for charging, discharging, and load management. The DC bus can be a high-voltage line (e.g., in a range of 110 V RMS to 130 V RMS) that can deliver stored energy from the battery 213 to the multi-mode inverter 212 for conversion and distribution throughout the appliance 230 or, conversely, can allow the multi-mode inverter 212 to recharge the battery 213, for example, when AC power is available. The battery 213 can be configured based on (or defined by) at least in part the characteristics of the appliance 230. For example, the battery 213 can have a capacity of up to 3 kilowatt hours (kwh) with which to power the appliance 230 (e.g., when the AC source 220 is unavailable, when the appliance 230 consumes more current than can be provided by the AC source 220 alone, etc.). Furthermore, the battery 213 can be included in multiple batteries coupled in series to increase storage capacity. For example, the battery 213 can be one of many 3.2V rechargeable batteries, which, when coupled in series, can store enough energy to at least partially meet conditions of the appliance 230. For longevity, the battery 213 can be, for example, a lithium-based battery such as a lithium iron phosphate battery, which minimizes risks of thermal runaway, short circuits, and overheating, as well as typically providing between 3,000 and 5,000 cycles.

In some implementations, the battery 213 can include a battery management system (not shown), with interfaces to communicatively couple with the multi-mode inverter 212. The battery 213 can include a communication interface (not shown) connected to the internal BMS (not shown), which can be coupled to the communication bus. The communication bus can facilitate real-time (e.g., without perceived delay) data exchange between the battery's internal battery management system, the processor 217, and the appliance 230. For example, the processor 217 can communicate with the battery 213 to form a charging strategy when the multi-mode inverter 212 is in battery charging mode. The charging strategy can be defined at least in part by the characteristics of the appliance 230, for example more specifically by the appliance type, the type of energy that the appliance 230 consumes, and/or the power rating of the appliance 230. Through the communication bus, the BMS of the battery 213 can monitor and manage parameters such as state of charge (SoC), voltage, current, temperature, and health status, allowing the power management system 200 to dynamically manage energy flow and ensure operational safety.

For enhanced protection, the battery 213 can optionally include two dedicated safety monitoring signals linked to the battery connector: a battery HV contact NTC sensor (not shown) and an HVIL loop (not shown). In accordance with some embodiments of the present disclosure, the battery HV contact NTC sensor can provide temperature readings at the battery's main contact points, allowing the processor 217 to detect overheating conditions that can lead to thermal runaway. Meanwhile, the HVIL loop is a safety circuit that can detect if any high-voltage connectors are improperly seated or opened during operation, triggering shutdown procedures to prevent electrical hazards.

Accordingly, the communication interface of the battery 213 can encapsulate a smart, multi-functional battery interface, which can not only route energy but also serve as a monitoring and communication hub. The battery connector can ensure that the battery 213 operates safely, efficiently, and transparently within the larger appliance energy ecosystem, maintaining tight integration between mechanical, electrical, and digital control domains.

The multi-mode inverter 212 can manage power flow between the AC source 220, the battery 213, and the appliance 230. The multi-mode inverter 212 can be coupled to the power interface 211 and the power interface 214 by the AC bus. The multi-mode inverter 212 can be coupled to the battery 213 and the power interface 214 by the DC bus. The multi-mode inverter can include various bidirectional power electronics (not shown) that can either rectify AC to DC (e.g., for battery charging or supply to the appliance 230), and/or invert DC to AC (e.g., for backfeeding to the AC source 220 or running the appliance 230). The multi-mode inverter 212 can dynamically switch between modes depending on demand, source availability, and battery state.

The multi-mode inverter 212 can operate according to one of various modes, which can include, for example, battery charging mode, DC supply mode, AC supply mode, battery discharging mode, and backfeeding mode. When in AC supply mode, the multi-mode inverter 212 can receive AC input from AC source 220 and can send AC output to the appliance 230. When in battery charging mode (e.g., when the appliance is idle, when AC energy is available, etc.) the multi-mode inverter 212 can rectify AC input to produce DC output and can send the DC output to the battery 213 to cause the battery 213 to charge. When in DC supply mode, the multi-mode inverter 212 can rectify AC input to produce DC output and can send the DC output to the appliance 230. When in battery discharging mode (e.g., when the AC source 220 fails or is intentionally bypassed), the multi-mode inverter 212 can send DC output from the battery 213 to the appliance 230, or can invert the DC output from the battery 213 to produce AC output and can send the AC output to the appliance 230. When in backfeeding mode (e.g., when the appliance is idle, when DC energy is available, etc.) the multi-mode inverter 212 can invert DC output from the battery 213 to produce AC output, can synchronize phase and frequency of the AC output (e.g., using a phase-locked loop or other suitable feedback circuit), and can send the AC output to the power interface 211 (e.g., for backfeeding to the AC source 220). Accordingly, the power management system 200 can improve (or optimize) energy flow dynamically based on grid status, battery state of charge, load demand, and user-defined operating modes.

Each mode of the multi-mode inverter 212 can be defined at least in part by the appliance type of the appliance 230. In some instances, the appliance type of the appliance 230 can be associated with the type of voltage and/or current that powers the appliance 230. For example, when the processor 217 determines that the appliance 230 is a DC stove, the multi-mode inverter 212 can be configured to operate in DC supply mode and configured to not operate in AC supply mode. As another example, when the processor 217 determines that the appliance 230 is an AC refrigerator, the multi-mode inverter 212 can be configured to operate in AC supply mode and configured to not operate in DC supply mode. In some instances, the appliance type of the appliance 230 can be indicative of its (expected) rate and (expected)

amount of energy consumption. For example, when the processor 217 determines that the appliance 230 is a high-power heater (e.g., a water heater), the multi-mode inverter 212 can be configured to operate in AC supply mode and configured to not operate in battery charging mode. In this way, the multi-mode inverter 212 can be configured to operate in the context of the appliance type of the appliance 230, when the multi-mode inverter 212 is coupled to the appliance 230. The multi-mode inverter 212 can interface with various types of appliances without being preconfigured (e.g., configured during a manufacturing period of either the multi-mode inverter 212 or the appliance 230) to interface with any particular appliance type.

The multi-mode inverter 212 can include a communication interface (not shown) configured to be coupled with the communication bus of the modular core 210. The communication interface can be, for example, a control area network (CAN) connector, and the communication bus can be, for example, a CAN bus. The communication bus can connect the multi-mode inverter 212 with other components, including but not limited to a battery management system (BMS) (not shown) for the battery 213, the processor 217, the communication interface 216 of the modular core 210, the communication interface 231 of the appliance 230, other smart appliances or monitoring tools (not shown), and/or grid interface controllers and monitoring tools (not shown). The communication bus can enable real-time (e.g., within a few milliseconds) data exchange indicating, for example, battery voltage, state of charge (SoC), temperature, inverter status and faults, system mode control (e.g., battery charging, battery discharging, etc.), telemetry for cloud-based monitoring, etc. Accordingly, the multi-mode inverter 212 can connect to (e.g., plug into, etc.) the communication bus shared by other components of the power management system 200 like the battery 213, the processor 217, and, in some instances, sensors (not shown). The communication bus can thereby enable coordinated operation, safety, and diagnostics across the power management system 200.

The multi-mode inverter 212 can also be configured to enable power to be provided to the appliance 230 such that the appliance 230 can draw power from both (e.g., as a sum) the battery 213 and the output of the multi-mode inverter 212 (e.g., maximum power output from the multi-mode inverter 212). In other words, rather than just drawing the maximum power from the battery 213, the multi-mode inverter 212 can be configured to provide its maximum output power, which can be supplemented with additional power from the battery 213 as desired. In this way, the multi-mode inverter 212 can provide combined power output to the appliance 230. The multi-mode inverter 212 can be configured to provide up to a particular limit such as for example about 15 kilowatts of power to the appliance 230.

The processor 217 can be a hardware-based integrated circuit (IC) and/or any other suitable processing device configured to run or execute a set of instructions and/or code stored, for example, in the memory 218. For example, the processor 217 can be a general-purpose processor, a central processing unit (CPU), an accelerated processing unit (APU), an application specific integrated circuit (ASIC), a network processor, a front-end processor, a field programmable gate array (FPGA), a programmable logic array (PLA), and/or the like. The processor 217 can be in communication with the memory 218 via any suitable interconnection, system bus, circuit, and/or the like. The processor 217 can include any number of engines, processing units, cores, etc. configured to execute code, instructions, modules, processes, and/or functions associated with monitoring parameters of the power management system 200, routing power among components of the power management system 200, and/or coordinating control signals to cause one or more components to perform a function. For example, the processor 217 can be caused to monitor voltages, temperatures, operational modes, state information, safety conditions of the power management system 200. Furthermore, the processor 217 can be caused to, for example, issue operational commands to the multi-mode inverter 212, enabling controlled transitions between modes, such as powering the appliance 230 when the appliance runs on DC (DC supply mode), powering the appliance 230 when the appliance runs on AC (AC supply mode), charging the battery 213 (battery charging mode), discharging the battery 213 to power the appliance 230 (battery discharging mode), and discharging the battery to backfeed the AC source 220 (backfeeding mode), without requiring manual intervention from the user.

The memory 218 can be, for example, a stack memory, a random-access memory (RAM), a memory buffer, a magnetic disk (e.g., hard drive memory), a read-only memory (ROM), an erasable programmable read-only memory (EPROM), a flash memory, and/or the like. The memory 218 can be configured to store, for example, one or more software modules and/or code that can include instructions that can cause the processor 217 to perform one or more processes, functions, and/or the like, as discussed above. For example, the instructions can include conditions, which, when met, would cause the processor 217 to configure the multi-mode inverter 212 to be in a specific mode. The processor 217 can be caused to, for example, generate a control signal that, when communicated to the multi-mode inverter 212, causes the multi-mode inverter 212 to be in a specific mode. The conditions to cause the processor 217 to generate a control signal can include, for example, a parameter of the power management system 200 meeting and/or surpassing a threshold value, verifying a property of the appliance 230 (e.g., identifying the appliance type, identifying the type of energy the appliance 230 consumes, etc.), determining a state of the battery 213, the AC source 220, the appliance 230, the multi-mode inverter 212 (e.g., the appliance 230 being idle for a certain amount of time), and/or any other suitable condition.

In some implementations, the appliance 230 can be manufactured specifically to operate and communicate with the modular core 210, or another modular core (not shown). For example, the appliance 230 can have a housing having an interface portion (not shown) configured to complementarily fit with an interface portion of the housing 201. Furthermore, the communication interface 231 can be configured to comply with the same communication protocol as the communication bus of the modular core 210.

In some implementations, any of the components within the modular core 210 can be outside of the housing 201 and instead can be within other housing(s) (not shown), and/or in the appliance 230. The components of the modular core 210 that are outside of the housing 201 and that are configured to be within the appliance 230 can be removably coupled with each other and/or with remaining components of the modular core 210 that are within the housing 201, such that the modular core 210 can manage and distribute power between the AC source 220, the battery 213, and the appliance 230. Similarly, the components of the modular core 210 that are outside of the housing 201 and that are configured to be within multiple different housings in addition to the housing 201 can be removably coupled with each other, such that the modular core 210 can manage and distribute power between the AC source 220, the battery 213, and the appliance 230. For example, in some instances, the battery 213 can be in a first housing, and the multi-mode inverter 212, the power interface 211, the power interface 214, the processor 217, the memory 218, the communication interface 216, and the sensing circuit 215 can be in a second housing. Furthermore, the first housing and the second housing can be removably coupled with each other and can collectively be removably coupled with the appliance 230. This can be useful, for example, should the battery 213 be swapped with another battery (not shown). Instead, or in addition, in some instances, there can be one or more other multi-mode inverters (not shown) and/or one or more other batteries (not shown), which can each be enclosed by a different housing. The housings enclosing the other multi-mode inverters and/or other batteries can be removably coupled together with the housing 201 and can collectively be removably coupled with the appliance 230.

In some implementations, the modular core 210 can include an earth ground (GND) terminal (also referred to herein as the chassis ground or protective ground; not shown). The earth GND terminal can be a grounding point that connects the housing 201 (and optionally the appliance) to the earth ground. The earth GND terminal can be, for example, a stud or screw connected to the housing 201, a green/yellow wire from AC supply, or other equipment grounds. The earth GND terminal can provide a safety path for stray current in case of insulation failure, preventing electric shock or fire risk. The earth GND terminal is specified by electrical codes (e.g., NEC, UL, IEC) for Class I electrical appliances and high-voltage systems like inverters. If a fault occurs (e.g., a live wire contacts the metal enclosure), the earth GND path extending from the earth GND terminal can ensure the fault current safely flows to the ground, tripping a breaker or fuse (not shown). A solid earth ground can also help reduce electromagnetic interference (EMI) and improve the electromagnetic compatibility (EMC) of the modular core 210. Further, the earth GND terminal can help stabilize voltage levels and avoid dangerous voltage potential differences among components of the power management system 200.

In some implementations, the modular core 210 can include an optional physical interface that supports communication defined by a particular communication protocol, scheme, or standard. For example, the modular core 210 can include an RS-485 connector. The RS-485 connector can be a physical interface that supports communication using the RS-485 standard, which is a widely used differential serial communication protocol known for its robustness, long-distance capability, and noise immunity. RS-485 (also known as TIA-485 (-A) or EIA-485) is a serial communication standard used for reliable half-duplex or full-duplex data transmission over twisted-pair cables. It allows multiple devices (up to 32) to communicate on the same bus using a master-slave or peer-to-peer configuration. In accordance with some embodiments of the power management system disclosed herein, the RS-485 connector can serve one or more of the following roles: (1) debugging and diagnostics, e.g., connecting service tools or computers for low-level access, logging, firmware updates, and troubleshooting; (2) interfacing with external devices, e.g., allowing communication with external energy meters, smart home hubs, or other control systems that use RS-485 for industrial protocols (like Modbus RTU, a common RS-485 protocol); (3) robust field communication, which is mainly due to that RS-485 is more tolerant to electrical noise and supports long cable runs (e.g., up to 1,200 meters), making it useful for grid-tied inverter installations where remote monitoring/ control is desired; (4) legacy system integration, e.g., supporting compatibility with older or industrial systems where RS-485 remains a standard over newer interfaces like CAN or Ethernet. Accordingly, the optional physical interface can provide a versatile, robust, and industry-standard communication port that is especially useful for diagnostics, remote monitoring, third-party system integration, and communication in harsh or extended wiring environments.

In some implementations, the modular core 210 can include an additional sensing circuit (not shown) configured to measure the AC power being drawn from or received by the AC source 220. The additional sensing circuit can include, for example, a voltage sensor and/or a current sensor for this purpose. The additional sensing circuit can be used to determine a state of the AC source 220. For example, in some instances, the AC source 220 can fail, causing a power outage event. During a power outage, no current can be drawn from the AC source 220. Instead, or in addition, the AC source 220 can partially fail, causing a brownout. During a brownout, some current can be drawn from the AC source 220 but not enough to sufficiently maintain performance of the appliance 230. Instead, or in addition, the AC source 220 can be coupled to a number of additional other devices (not shown), reducing an amount of current available to be drawn from the AC source 220.

Figure 3A:
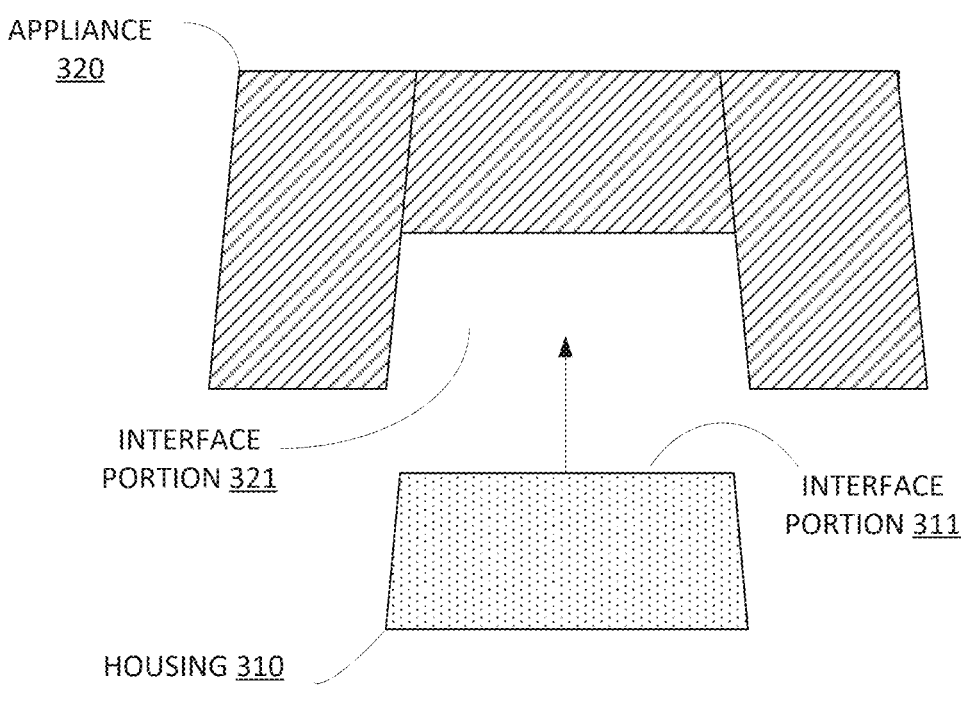
FIG. 3A is an illustration of an example complementary fit of an interface portion of a housing with an interface portion of an appliance, according to an embodiment.

FIG. 3A is an illustration of an example complementary fit of an interface portion 311 of a housing 310 with an interface portion 321 of an appliance 320, according to an embodiment. The housing 310 can be structurally and/or functionally similar to the housing 101 of FIG. 1. The housing 310 can enclose a modular core (e.g., the modular core 110 of FIG. 1; not shown in FIG. 3A) configured to power the appliance 320. The appliance 320 can be structurally and/or functionally similar to the appliance 130 of FIG. 1. As shown, the interface portion 321 of the appliance 320 can have various surfaces configured to receive the housing 310 based on the shape and/or size of the housing 310, thereby facilitating a complementary fit. A complementary fit can result in a form factor for the combined housing 310 and appliance 320 that is more compact, aesthetically pleasing, and structurally superior to a form factor produced by a non-complementary fit. In accordance with some embodiments of the present disclosure, however, the complementary fit between a housing enclosing a modular core and an appliance can be a non-complementary fit (e.g., when an appliance is not manufactured specifically to couple with a modular core). In such embodiments, an interface member can be used to interconnect the housing and the appliance. For example, such an interface member on one side can have a complimentary fit with the housing and the interface member on an opposite side can have a complimentary fit with the appliance. Furthermore, such an interface member can have an aperture on one side and an aperture on the opposite side, which collectively can provide a passthrough for electrical and communication pathways between the housing and the appliance.

Figure 3B:
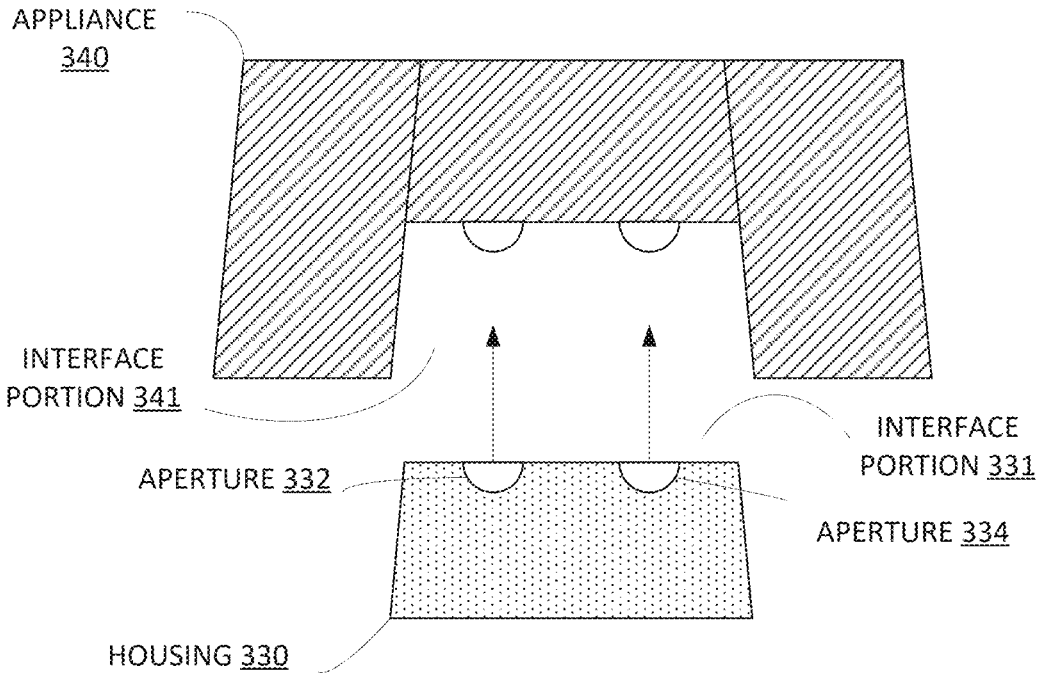
FIG. 3B is an illustration of an example complementary fit of an interface portion of a housing with an interface portion of an appliance with complementary interfaces, according to an embodiment.

FIG. 3B is an illustration of an example complementary fit of an interface portion 331 of a housing with an interface portion 341 of an appliance 340, according to an embodiment. The housing 330 can be structurally and/or functionally similar to the housing 101 of FIG. 1. The housing 330 includes an aperture 332 and an aperture 334 on the interface portion 331, which, in some implementations of the power management system 100 of FIG. 1, can provide access to various interface(s) of the modular core enclosed by the housing 330. The aperture 332 and the aperture 334 can be complementarily fit with the interface portion 341 of the appliance 340, which can have portions that provide access to various interface(s) of the appliance 340. The appliance 340 can be structurally and/or functionally similar to the appliance 130 of FIG. 1. While shown and described in FIG. 3B as having two apertures, the housing 330 can have one or more apertures, recesses, or other suitable access points that facilitate electrical, mechanical, and/or communicative couplings between the appliance 340 and the modular core enclosed by the housing 330.

In some embodiments or some implementations, a housing of a modular core can have components other than or in addition to those described in FIGS. 3A-3B, which can result in a complementary fit or otherwise define a compatible coupling. In some implementations, the housing can have a protrusion (or passageway) configured to complementary fit to a matching passageway (or protrusion) of the appliance. The matching protrusion and passageway can define a key, which can ensure that only a compatible modular core can be coupled with an appliance. In some instances, the key can be of a key system that includes different types of keys distinguished by different mechanical or magnetic features of the matching protrusion and passageway. For example, the matching protrusion and passageway that define a key can have detents that define a key type. In some instances, appliances of different appliance types can be configured to have keys of different key types. The mechanical/magnetic features of the matching protrusion and passageway can thereby be indicative of the appliance type with respect to the modular core. In some instances, a modular core can have many protrusions (or passageways), each one configured to match to a passageway (or protrusion) of an appliance of a different appliance type. In response to a fit between a matching protrusion and passageway (or other matching members), the modular core can be configured to determine the appliance type. For example, the fit between the matching protrusion and passageway can trigger switches (e.g., electromechanical switches such as relays, transistor-based switches, etc.), which can cause a signal to propagate to the processor.

In some implementations, a complementary fit between a housing of a modular core and an appliance can complete a circuit, which can indicate that the modular core has been removably coupled to the appliance. In some instances, the appliance can be caused to send data that is representative of the appliance type to the modular core, in response to the removable coupling. In some instances, the modular core can be caused to determine the appliance type, in response to the removable coupling. For example, the appliance can have an electromagnetic member (e.g., a magnet) with electromagnetic properties that can be measured by a sensor (e.g., a hall sensor) at the modular core of the housing. In response to detecting the electromagnetic member in the appliance, the sensor of the modular core of the housing can cause the processor (e.g., the processor 217 of FIG. 2) to initiate various processes at the modular core associated with, for example, powering the appliance. In some instances, the electromagnetic properties can be representative of characteristics of a type of appliance. In response to detecting the electromagnetic member in the appliance, the modular core can determine the appliance type, based on the electromagnetic properties. Instead, or in addition, housing can have a passive component(s) (e.g., a resistor(s), a capacitor(s), an inductor(s)) that can exhibit a strong response (e.g., a high amplitude within a narrow spectral band) when driven by a voltage source at the appliance. Features of the spectral band (e.g., a center frequency, a full-width at half maximum, a bandwidth, etc.) can be representative of characteristics of a type of appliance. In response to a driving of the passive components by the voltage source, the modular core of the housing can cause the processor to determine the appliance type, based on the features of the spectral band.

In some implementations, a modular core and an appliance can execute an authorization process (e.g., a handshaking process). The authorization process can include, for example, establishing communications, agreeing on communication parameters (e.g., a common communication protocol, encryption method, etc.), exchanging cryptographic keys (e.g., a public key of a public-private key pair), and/or other suitable measures. The authorization process can ensure that unauthorized modular cores (e.g., modular cores that fail the authorization process) cannot be used to manage and distribute power to appliances (e.g., any appliance, an appliance of a particular type, etc.).

Figure 4:
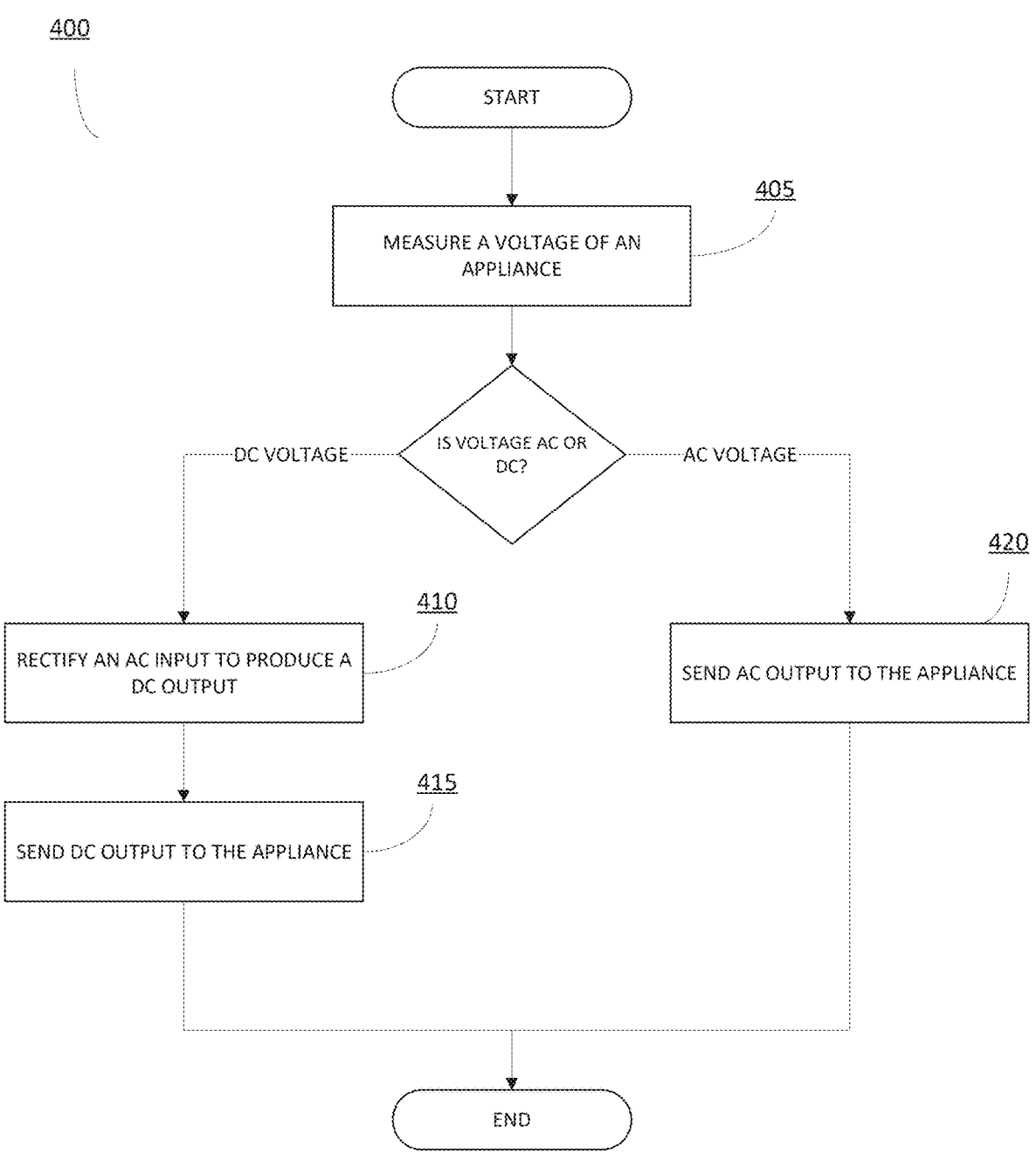
FIG. 4 is a flow diagram of an example method for measuring a voltage of an appliance, according to an embodiment.

FIG. 4 is a flow diagram of an example method 400 for measuring a voltage of an appliance, according to an embodiment. The example method 400 can be implemented by the modular core 210 of FIG. 2, for example, when electrically coupled to the appliance 230 of FIG. 2.

At 405, the example method 400 includes measuring a voltage of an appliance (e.g., the appliance 230 of FIG. 2, or another appliance). A sensing circuit (e.g., the sensing circuit 215 of FIG. 2) can measure the voltage of the appliance by measuring a voltage of a power bus (e.g., an AC bus and/or a DC bus) that is coupled to the appliance. The voltage can be a DC voltage or an AC voltage. A processor (e.g., the processor 217 of FIG. 2) can generate a signal that is representative of the type (e.g., AC or DC), the amplitude, and/or the phase of the voltage, and can send the signal to a multi-mode inverter (e.g., the multi-mode inverter 212 of FIG. 2) to cause the multi-mode inverter to stay in a mode or change modes, based on the voltage. For example, if the voltage potential on the DC bus is near zero volts (or less than a predefined threshold value associated with an operation of the appliance), then it can be assumed that the appliance is not consuming DC energy, at least for a period of time, and therefore the multi-mode inverter can be configured to be in battery charging mode, AC supply mode, or backfeeding mode, and not in DC supply mode. Furthermore, if the voltage potential on the AC bus is also near zero volts (or less than a predefined threshold value associated with an operation of the appliance), then it can be assumed that the appliance is not consuming AC energy, at least for a period of time, and therefore the multi-mode inverter can be configured to be in battery charging mode or backfeeding mode, and not in AC supply mode or DC supply mode, depending on the charging state of the battery and power demand of other components. In some implementations, the example method 400 can include measuring a different metric associated with the appliance, such as a current value, a power value, or other suitable metric that can quantify the power consumption of the appliance and/or qualify the power consumption as being AC power or DC power.

At 410, the example method 400 includes rectifying, in response to the voltage being a DC voltage, an AC input to produce a DC output. A rectifier (not shown), for example, of a multi-mode inverter can rectify the AC input to produce the DC output. The multi-mode inverter can be caused to rectify an AC input when the multi-mode inverter is in at least one of DC supply mode or battery charging mode. The AC input can be from an AC source (e.g., the AC source 220 of FIG. 2) such as an AC grid, and can be drawn from the AC source via an AC bus that couples the multi-mode inverter and the AC source. In the example method 400, the appliance is assumed to be consuming energy in support of its operation for at least a period of time. As such, the multi-mode inverter can be configured to be in DC supply mode. In some implementations, a processor can be caused to ensure that the DC output from the multi-mode inverter can meet the power demand of the appliance, for example, via a communication bus among the processor, multi-mode inverter, and the appliance.

At 415, the example method 400 includes sending, in response to the voltage being a DC voltage, the DC output to the appliance. A multi-mode inverter can send the DC output to the appliance via, for example, a DC bus.

In some implementations, the appliance does not consume energy in support of its operation, for example, during a subsequent period of time (an "idle" time) after the "operational" period of time. The example method 400 can include, during the idle time, causing the multi-mode inverter to be in battery charging mode (e.g., sending DC energy to a battery), for example, when the idle time meets and/or surpasses a time period threshold value (e.g., a predefined time limit), in response to a control signal coordinated by a processor, or simply based on a lack of demand from the appliance. The example method 400 can include, during the idle time, causing the multi-mode inverter to be in battery discharging mode and/or backfeeding mode, for example, when the charge state of the battery meets and/or surpasses a charge threshold value, when the idle time meets and/or surpasses a time period threshold value (e.g., a predefined time limit), in response to a control signal coordinated by the processor, and/or based on a power demand of an AC source or the appliance.

At 420, the example method 400 includes sending, in response to the voltage being an AC voltage, an AC output to the appliance. A multi-mode inverter can send the AC output to the appliance via, for example, an AC bus. In some instances, the AC output can be supplied to the multi-mode inverter from an AC source. In some instances, the multi-mode inverter can be caused to discharge a battery, for example, when configured in battery discharging mode, and can invert the DC output from the battery to produce the AC output.

Figure 5:
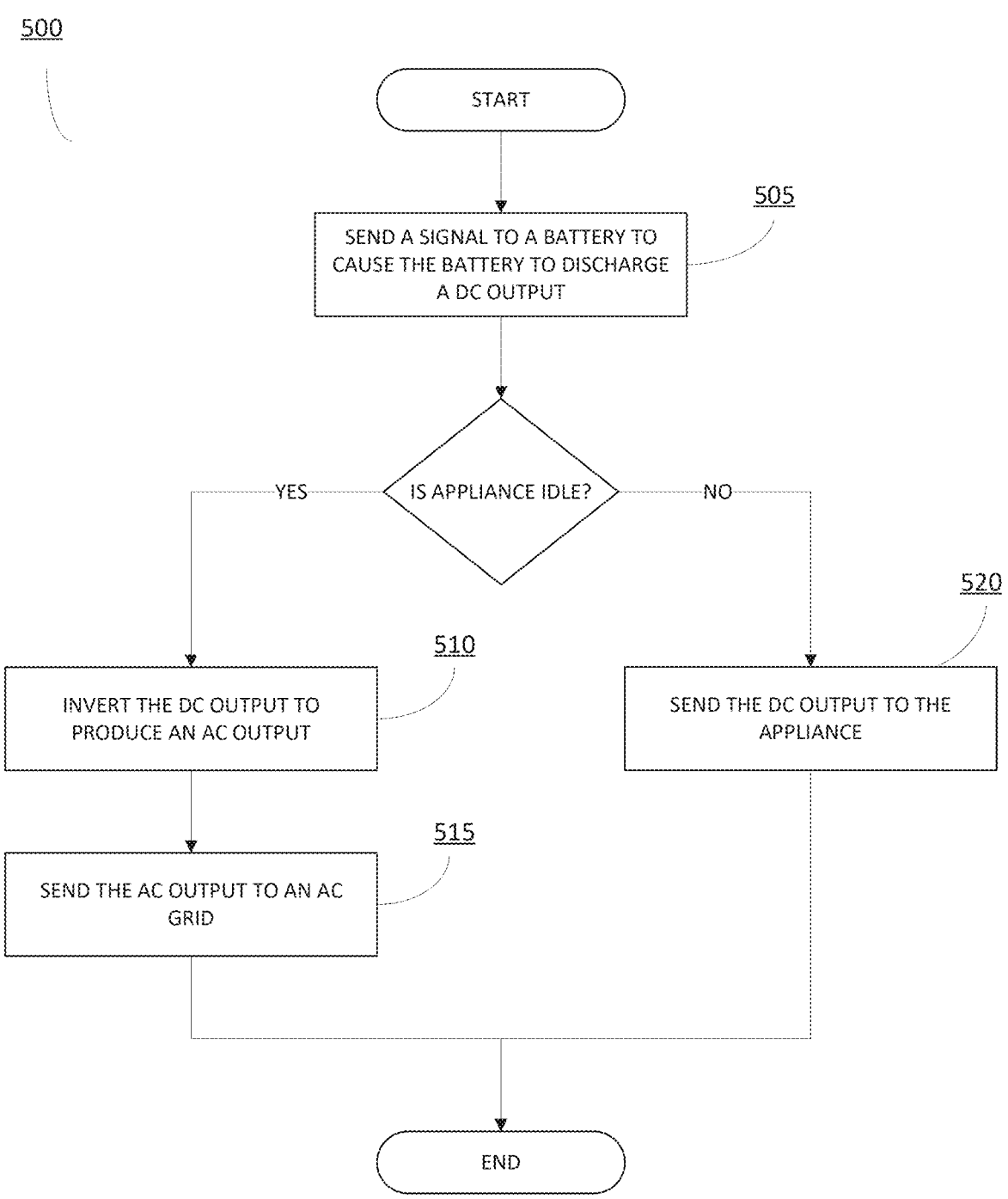
FIG. 5 is a flow diagram of an example method for distributing power from a battery, according to an embodiment.

FIG. 5 is a flow diagram of an example method 500 for distributing power from a battery, according to an embodiment. The example method 500 can be implemented by the modular core 210 of FIG. 2, for example, when it is electrically coupled to the appliance 230 of FIG. 2 (e.g., an AC grid).

At 505, the example method 500 includes sending a signal to a battery (e.g., the battery 213 of FIG. 2) to cause the battery to discharge a DC output. A multi-mode inverter (e.g., the multi-mode inverter 212 of FIG. 2) can send the signal to the battery, via a communication bus (e.g., a CAN bus) that communicatively couples the multi-mode inverter and the battery. The multi-mode inverter can also receive the DC output, via a DC bus that electrically couples the multi-mode inverter and the battery. The multi-mode inverter can be configured in battery discharging mode, and/or caused to switch modes to be in battery discharging mode based on the signal. In some instances, a processor (e.g., the processor 217 of FIG. 2) can generate the signal. Similar to description for FIG. 4, the multi-mode inverter here can be caused to be in battery discharging mode, for example, when the charge state of the battery meets and/or surpasses a charge threshold value, when an idle time of the appliance meets and/or surpasses a predefined time limit, in response to a control signal coordinated by a processor, and/or based on a power demand of the AC source or the appliance.

At 510, the example method 500 includes inverting, when the appliance is idle, the DC output to produce an AC output. An inverter (not shown), for example, of a multi-mode inverter can invert the DC output to produce the AC output. The multi-mode inverter can be caused to invert the DC output when the multi-mode inverter is configured to be in backfeeding mode or AC supply mode. Furthermore, when the appliance is idle, the multi-mode inverter can be configured to be in backfeeding mode, and not in AC supply mode or DC supply mode. The AC output can have a phase and a frequency that is synchronized to a phase and frequency of the AC source. The multi-mode inverter can, in some instances, include an additional electronic circuit such as a phase-locked loop for this purpose. The multi-mode inverter can match the AC output to a reference waveform, which can be provided to the multi-mode inverter for example by a sensing circuit at the AC source, and/or via a communication interface to a zero export controller (not shown). The zero export controller can continuously monitor voltage and current of the AC source, and communicate with the multi-mode inverter to cause the multi-mode inverter to match or stay below the AC source demand. At 515, the example method 500 includes sending the AC output to an AC grid.

At 520, the example method includes sending, when the appliance is operational, the DC output to the appliance. A multi-mode inverter can send the DC output to the appliance via, for example, a DC bus.

Figure 6:
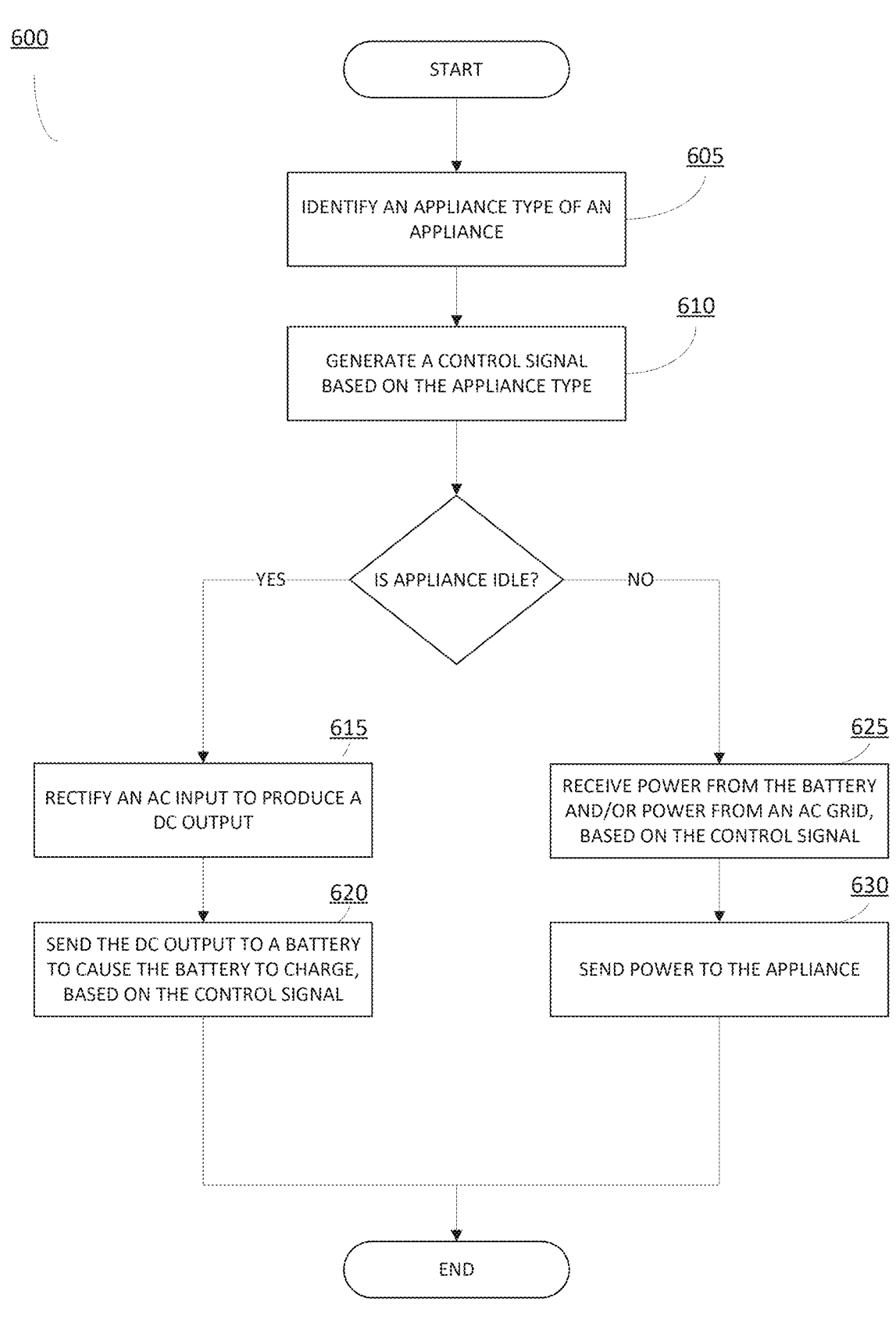
FIG. 6 is a flow diagram of an example method for distributing power based on an appliance type, according to an embodiment.

FIG. 6 is a flow diagram of an example method 600 for distributing power based on an appliance type, according to an embodiment. The example method 600 can be implemented by the modular core 210 of FIG. 2, for example, when it is electrically coupled to the appliance 230 of FIG. 2.

At 605, the example method 600 includes identifying an appliance type of an appliance. A processor (e.g., the processor 217 of FIG. 2) can identify the appliance type from multiple types of appliances. Identifying can include identifying in response to a communicative coupling between a communication interface (e.g., the communication interface 216 of FIG. 2) of the modular core and a communication interface (e.g., the communication interface 231 of FIG. 2) of the appliance (e.g., via a communication bus). For example, the processor can request information about the appliance, and the appliance can respond with data that is representative of characteristics of the appliance type. Identifying can include identifying in response to a sensing circuit (e.g., the sensing circuit 215 of FIG. 2) measuring and relaying electrical parameters of the appliance, identifying in response to a complementary fit between the modular core and the appliance (e.g., when the complementary fit completes a circuit, triggers electromechanical switches, or otherwise), identifying in response to receiving information representative of the appliance type from the appliance, and/or the like. For example, a memory (e.g., the memory 218 of FIG. 2) can store a look-up table, a map, or another data structure that includes expected electrical parameters for various appliance types. The processor can compare the measured electrical parameters to the expected electrical parameters to identify the appliance type.

At 610, the example method 600 includes generating a control signal based on the appliance type. In response to identifying the appliance type, the processor can generate the control signal. The control signal can, for example, indicate characteristics of the appliance type and/or instructions defined by the characteristics of the appliance type. The processor can send the control signal to a multi-mode inverter (e.g., the multi-mode inverter 212 of FIG. 2) via the communication bus. The control signal can cause the multi-mode inverter to be in a mode that can meet conditions of the appliance based on the appliance type. For example, the multi-mode inverter can be caused to update a power allocation strategy based on the appliance type.

At 615, the example method 600 includes rectifying, when the appliance is idle, an AC input to produce a DC output. A rectifier (not shown), for example, of the multi-mode inverter can rectify the AC input to produce the DC output. The multi-mode inverter can be caused to rectify an AC input when the multi-mode inverter is in at least one of DC supply mode or battery charging mode. Furthermore, when the appliance is idle, the multi-mode inverter can be configured to be in battery charging mode, and not in DC supply mode. The AC input can be from the AC source (e.g., an AC grid), and can be drawn from the AC source via an AC bus that couples the multi-mode inverter and the AC source.

At 620, the example method 600 includes sending, when the appliance is idle, the DC output to a battery (e.g., the battery 213 of FIG. 2) to cause the battery to charge, based on the control signal. The multi-mode inverter can send the control signal to the battery's internal battery management system, which can update its charging strategy based on the appliance type.

At 625, the example method 600 includes receiving, when the appliance is operational, power from the battery and/or power from an AC grid, based on the control signal. In some instances, the multi-mode inverter can receive power from the battery alone, for example, when the AC grid is unavailable. In some instances, the multi-mode inverter can receive power from the AC grid alone, for example, when the battery is not sufficiently charged. In some instances, the multi-mode inverter can receive power from the battery and power from the AC grid. The multi-mode inverter can be caused to manipulate the power from the battery and/or the power from the AC grid to produce power that can be input into the appliance, based on the appliance type. For example, the multi-mode inverter can be caused to invert the power from the battery to produce an AC output. Depending on the power demand of the appliance, the multi-mode inverter can be caused to power the appliance using the AC output associated with the battery, and/or the power from the AC grid (e.g., as a sum). Instead, or in addition, the multi-mode inverter can be caused to rectify the power from the AC grid to produce a DC output. Depending on the power demand of the appliance, the multi-mode inverter can be caused to power the appliance using the DC output associated with the AC grid, and/or the power from the battery (e.g., as a sum). At 630, the example method 600 includes sending, when the appliance is operational, the power to the appliance.

While shown and described as being three separate example methods, the example method 300, the example method 500, the example method 600, and aspects thereof each example method can be interspersed with each other. Each of these methods is related to various configurations of the multi-mode inverter (e.g., the multi-mode inverter 212 of FIG. 2), and are merely demonstrative of various processes including the multi-mode inverter.

In some embodiments, an apparatus comprises: a housing having an interface portion configured to complementarily fit with an interface portion of an appliance, the appliance being of an appliance type; a communication interface at least partially disposed in the housing and configured to be communicatively, removably coupled with the appliance; a power interface at least partially disposed in the housing and configured to be electrically, removably coupled with the appliance; a processor at least partially disposed in the housing and configured to (1) identify the appliance type from a plurality of appliance types in response to a communicative coupling between the communication interface and the appliance and (2) generate a control signal based on the appliance type; an alternating-current (AC) interface at least partially disposed in the housing and configured to be electrically coupled with an AC grid; a battery at least partially disposed in the housing; and a multi-mode inverter at least partially disposed in the housing, the multi-mode inverter configured to receive at least one of first power output from the AC grid or second power output from the battery and send third power output to the appliance during operation of the appliance, via the power interface and based on the control signal.

In some such implementations, the plurality of appliance types includes at least one of a stove, a refrigerator, an air conditioner, or a laundry machine.

In some such implementations, the appliance type is defined by at least one of a function of the appliance, an amount of power consumed by the appliance, an environment including the appliance, or a communicative ability of the appliance.

In some such implementations, the apparatus further comprises: a sensing circuit configured to detect a power outage event associated with the AC grid, the battery configured to discharge in response to the power outage event and during operation of the appliance.

In some such implementations, the AC grid and the first power output each has a root mean square (RMS) voltage within a range of 110V to 240V and a frequency from any one of 50 Hz or 60 Hz.

In some such implementations, the second power output has a root mean square (RMS) voltage within a range of 110V to 130V.

In some such implementations, the battery is included in a plurality of batteries coupled in series and at least partially disposed within the housing, the plurality of batteries have a 3 kilowatt hour rating.

In some embodiments, a method comprises: measuring, using a sensing circuit of a multi-mode inverter, a voltage of an appliance from a plurality of appliances, the multi-mode inverter being at least partially disposed in a housing, the housing with an interface portion configured to complementarily fit with an interface portion of the appliance from the plurality of appliances; rectifying, using the multi-mode inverter and in response to the voltage being a direct-current (DC) voltage, an alternating-current (AC) input to produce a DC output; sending, from the multi-mode inverter, the DC output to the appliance during operation of the appliance from the plurality of appliances; and sending, from the multi-mode inverter and in response to the voltage being an AC voltage, an AC output to the appliance during operation of the appliance.

In some such implementations, the DC output is a first DC output, the AC output is a first AC output, the AC input is from an AC grid, the method further comprising: sending a signal, from the multi-mode inverter and via a communication bus, to a battery to cause the battery to discharge a second DC output, the battery and the communication bus each being at least partially disposed in the housing; inverting, using the multi-mode inverter, the second DC output from the battery to produce a second AC output; and sending, from the multi-mode inverter, the second AC output to the AC grid.

In some such implementations, the sending the signal is in response to a measurement value satisfying a threshold value, the measurement value being a voltage of the AC grid.

In some such implementations, the appliance is idle during a time period; and the sending the signal is in response to the time period surpassing a time period threshold value.

In some such implementations, the appliance is at least one of a stove, a refrigerator, an air conditioner, or a laundry machine.

In some such implementations, the DC output has a root mean square (RMS) voltage within a range of 110V to 130V.

In some such implementations, the AC input and the AC output each has a root mean square (RMS) voltage within a range of 110V to 240V.

In some embodiments, an apparatus comprises: a housing having an interface portion configured to complementarily fit with an interface portion of an appliance from a plurality of appliances, each appliance from the plurality of appliances being of an appliance type from a plurality of appliance types; a power interface at least partially disposed in the housing and configured to be electrically, removably coupled with the appliance from the plurality of appliances; an alternating-current (AC) interface at least partially disposed in the housing and configured to be electrically coupled with an AC grid; a battery at least partially disposed in the housing; and a multi-mode inverter at least partially disposed in the housing, the multi-mode inverter having at least a first mode, a second mode, and a third mode each defined at least in part by the appliance type, the multi-mode inverter in the first mode configured to receive a first AC output from the AC grid, rectify the first AC output to produce a first DC output, and send the first DC output to the battery, the multi-mode inverter in the second mode configured to receive a second DC output from the battery, invert the second DC output to produce a second AC output, and send the second AC output to the AC grid, the multi-mode inverter in the third mode configured to send power output to the appliance from the plurality of appliances during operation of the appliance from the plurality of appliances, via the power interface.

In some such implementations, the AC grid, the first AC output, and the second AC output each has a root mean square (RMS) voltage within a range of 110V to 240V and a frequency from any one of 50 Hz or 60 Hz.

In some such implementations, the first DC output and the second DC output each has a root mean square (RMS) voltage within a range of 110V to 130V.

In some such implementations, the apparatus further comprises: a sensing circuit configured to detect a power outage event associated with the AC grid, the battery configured to discharge power in response to the power outage event, the multi-mode inverter being in the third mode.

In some such implementations, the multi-mode inverter is in at least one of the first mode or the second mode when the appliance from the plurality of appliances is idle.

In some such implementations, the multi-mode inverter is configured to not send power output to remaining appliances from the plurality of appliances.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a housing having an interface portion configured to complementarily fit with an interface portion of an appliance, the appliance being of an appliance type;
a communication interface at least partially disposed in the housing and configured to be communicatively, removably coupled with the appliance;
a power interface at least partially disposed in the housing and configured to be electrically, removably coupled with the appliance;
a processor at least partially disposed in the housing and configured to (1) identify the appliance type from a plurality of appliance types in response to a communicative coupling between the communication interface and the appliance and (2) generate a control signal based on the appliance type;
an alternating-current (AC) interface at least partially disposed in the housing and configured to be electrically coupled with an AC grid;
a battery at least partially disposed in the housing; and
a multi-mode inverter at least partially disposed in the housing, the multi-mode inverter configured to receive at least one of first power output from the AC grid or second power output from the battery and send third power output to the appliance during operation of the appliance, via the power interface and based on the control signal.

2. The apparatus of claim 1, wherein the plurality of appliance types includes at least one of a stove, a refrigerator, an air conditioner, or a laundry machine.

3. The apparatus of claim 1, wherein the appliance type is defined by at least one of a function of the appliance, an amount of power consumed by the appliance, an environment including the appliance, or a communicative ability of the appliance.

4. The apparatus of claim 1, further comprising:
a sensing circuit configured to detect a power outage event associated with the AC grid,
the battery configured to discharge in response to the power outage event and during operation of the appliance.

5. The apparatus of claim 1, wherein:
the AC grid and the first power output each has a root mean square (RMS) voltage within a range of 110V to 240V and a frequency from any one of 50 Hz or 60 Hz.

6. The apparatus of claim 1, wherein the second power output has a root mean square (RMS) voltage within a range of 110V to 130V.

7. The apparatus of claim 1, wherein:
the battery is included in a plurality of batteries coupled in series and at least partially disposed within the housing,
the plurality of batteries have a 3 kilowatt hour rating.

8. A method, comprising:
measuring, using a sensing circuit of a multi-mode inverter, a voltage of an appliance from a plurality of appliances, the multi-mode inverter being at least partially disposed in a housing, the housing with an interface portion configured to complementarily fit with an interface portion of the appliance from the plurality of appliances;
rectifying, using the multi-mode inverter and in response to the voltage being a direct-current (DC) voltage, an alternating-current (AC) input to produce a DC output;
sending, from the multi-mode inverter, the DC output to the appliance during operation of the appliance from the plurality of appliances; and
sending, from the multi-mode inverter and in response to the voltage being an AC voltage, an AC output to the appliance during operation of the appliance.

9. The method of claim 8, wherein the DC output is a first DC output, the AC output is a first AC output, the AC input is from an AC grid, the method further comprising:
sending a signal, from the multi-mode inverter and via a communication bus, to a battery to cause the battery to discharge a second DC output, the battery and the communication bus each being at least partially disposed in the housing;
inverting, using the multi-mode inverter, the second DC output from the battery to produce a second AC output; and
sending, from the multi-mode inverter, the second AC output to the AC grid.

10. The method of claim 9, wherein the sending the signal is in response to a measurement value satisfying a threshold value, the measurement value being a voltage of the AC grid.

11. The method of claim 9, wherein:
the appliance is idle during a time period; and
the sending the signal is in response to the time period surpassing a time period threshold value.

12. The method of claim 8, wherein the appliance is at least one of a stove, a refrigerator, an air conditioner, or a laundry machine.

13. The method of claim 8, wherein the DC output has a root mean square (RMS) voltage within a range of 110V to 130V.

14. The method of claim 8, wherein:
the AC input and the AC output each has a root mean square (RMS) voltage within a range of 110V to 240V.

15. An apparatus, comprising:
a housing having an interface portion configured to complementarily fit with an interface portion of an appliance from a plurality of appliances, each appliance from the plurality of appliances being of an appliance type from a plurality of appliance types;

a power interface at least partially disposed in the housing and configured to be electrically, removably coupled with the appliance from the plurality of appliances;

an alternating-current (AC) interface at least partially disposed in the housing and configured to be electrically coupled with an AC grid;

a battery at least partially disposed in the housing; and a multi-mode inverter at least partially disposed in the housing, the multi-mode inverter having at least a first mode, a second mode, and a third mode each defined at least in part by the appliance type, the multi-mode inverter in the first mode configured to receive a first AC output from the AC grid, rectify the first AC output to produce a first DC output, and send the first DC output to the battery, the multi-mode inverter in the second mode configured to receive a second DC output from the battery, invert the second DC output to produce a second AC output, and send the second AC output to the AC grid, the multi-mode inverter in the third mode configured to send power output to the appliance from the plurality of appliances during operation of the appliance from the plurality of appliances, via the power interface.

16. The apparatus of claim 15, wherein:

the AC grid, the first AC output, and the second AC output each has a root mean square (RMS) voltage within a range of 110V to 240V and a frequency from any one of 50 Hz or 60 Hz.

17. The apparatus of claim 15, wherein:

the first DC output and the second DC output each has a root mean square (RMS) voltage within a range of 110V to 130V.

18. The apparatus of claim 15, further comprising:

a sensing circuit configured to detect a power outage event associated with the AC grid, the battery configured to discharge power in response to the power outage event, the multi-mode inverter being in the third mode.

19. The apparatus of claim 15, wherein the multi-mode inverter is in at least one of the first mode or the second mode when the appliance from the plurality of appliances is idle.

20. The apparatus of claim 15, wherein the multi-mode inverter is configured to not send power output to remaining appliances from the plurality of appliances.

* * * * *